US009454524B1

United States Patent
Modani et al.

(10) Patent No.: US 9,454,524 B1
(45) Date of Patent: Sep. 27, 2016

(54) DETERMINING QUALITY OF A SUMMARY OF MULTIMEDIA CONTENT

(71) Applicant: Adobe Systems Incorporated, San Jose, CA (US)

(72) Inventors: Natwar Modani, Bengaluru (IN); Vaishnavi Subramanian, Bengaluru (IN); Shivani Gupta, Greater Noida (IN); Pranav Ravindra Maneriker, Pune (IN); Gaurush Hiranandani, Bengaluru (IN); Atanu R. Sinha, Boulder, CO (US); Utpal, Bokaro Steel (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/959,219

(22) Filed: Dec. 4, 2015

(51) Int. Cl.
    *G06F 17/28* (2006.01)
    *G06F 17/20* (2006.01)
    *G06F 17/27* (2006.01)
    *G06K 9/62* (2006.01)

(52) U.S. Cl.
    CPC ......... *G06F 17/2785* (2013.01); *G06K 9/6215* (2013.01)

(58) Field of Classification Search
    USPC ................................. 704/2, 3, 4, 5, 8, 9, 10
    See application file for complete search history.

(56) References Cited

U.S. PATENT DOCUMENTS

| | | | | |
|---|---|---|---|---|
| 7,209,875 | B2 * | 4/2007 | Quirk | G06F 17/28 704/2 |
| 7,430,179 | B2 * | 9/2008 | Towns-von Stauber | H04L 1/20 370/252 |
| 2003/0061022 | A1 * | 3/2003 | Reinders | G06F 17/289 704/2 |
| 2003/0154072 | A1 * | 8/2003 | Young | G06F 17/30017 704/9 |
| 2006/0153174 | A1 * | 7/2006 | Towns-von Stauber | H04L 1/20 370/356 |
| 2007/0099602 | A1 * | 5/2007 | Kurlander | H04M 1/72566 455/418 |
| 2010/0036878 | A1 * | 2/2010 | Kim | G06F 17/30781 715/716 |

OTHER PUBLICATIONS

Specia et al.,(2009) "Improving the Confidence of Machine Translation Quality Estimates," MT Summit XII, Ottawa, Canada,2009, 8 pages.*

Makoushina, J. (2007). Translation quality assurance tools: current state and future approaches. Translating and the Computer,29, 1-39.*

Bengio, Y. et al., "A Neural Probabilistic Language Model", Journal of Machine Learning Research, 2003, pp. 1137-1155, vol. 3.

(Continued)

*Primary Examiner* — Edgar Guerra-Erazo
(74) *Attorney, Agent, or Firm* — Finch & Maloney PLLC (57) ABSTRACT

A quality metric of a multimedia summary of a multimedia content item is determined based, in part, on semantic similarities of the summary and content item, rather than just on word frequencies. This is accomplished in some embodiments by identifying a semantic meaning of the summary and multimedia content item using vector analysis. The vectors of the summary and the vectors of the multimedia content item are compared to determine semantic similarity. In other examples, the quality metric of the multimedia summary is determined based on, in part, a coherence between an image portion of a summary and a text portion of the summary for determining a quality metric of a multimedia summary.

20 Claims, 3 Drawing Sheets

(56) References Cited

OTHER PUBLICATIONS

Collobert, R. et al., "A Unified Architecture for Natural Language Processing: Deep Neural Networks with Multitask Learning", Proceedings of the 25th International Conference on Machine Learning, 2008, 8 pgs.

Elman, Jeffrey L., "Distributed Representations, Simple Recurrent Networks, and Grammatical Structure", Machine Learning, 1991, pp. 195-225, vol. 7, Kluwer Academic Publishers, Boston, MA.

Kullback, S. et al., "On Information and Sufficiency", The Annals of Mathematical Statistics, Mar. 1951, pp. 79-86, vol. 22, No. 1.

Lin, Chin-Yew, "ROUGE: A Package for Automatic Evaluation of Summaries", In Proceedings of Workshop on Text Summarization Branches Out, Post-Conference Workshop of ACL, 2004, 10 pgs.

Papineni, Kishore et al., "BLEU: A Method for Automatic Evaluation of Machine Translation", Proceedings of the 40th Annual Meeting of the Association for Computational Linguistics, Jul. 2002, pp. 311-318.

Pollack, Jordan B., "Recursive Distributed Representations", Artificial Intelligence, Nov. 1990, 32 pgs., vol. 46.

Turian, Joseph et al., "Word Representations: A Simple and General Method for Semi-Supervised Learning", Proceedings of the 48th Annual Meeting of the Association for Computational Linguistics, Jul. 2010, pp. 384-394.

Voegtlin, Thomas et al., "Linear Recursive Distributed Represenations", Neural Networks, 2005, pp. 878-895, vol. 18, No. 7, Elsevier.

\* cited by examiner

DETERMINING QUALITY OF A SUMMARY OF MULTIMEDIA CONTENT

TECHNICAL FIELD

The present disclosure relates generally to the characterization of multimedia content. Specifically, the present disclosure relates to determining quality of a summary of multimedia content in which both the summary and the multimedia content include text and images.

BACKGROUND

Multimedia content generally refers to digital content that includes some combination of different content forms, including text and images (video, animation, graphics, etc). Such multimedia content is so ubiquitous and inexpensive that users are often overwhelmed with the process of selecting a multimedia content item to consume. Because of this, users of multimedia content often rely on summaries of multimedia content items. These summaries can be used either as a substitution for consuming a multimedia content item or used to facilitate selection of a multimedia content item to be consumed. Thus, the quality of a multimedia summary can have a significant impact on a prospective reader's decision to consume a given content item. Currently, however, there are no suitable methods to evaluate the quality of multimedia summaries.

DETAILED DESCRIPTION

As previously noted, there are no techniques for evaluating the quality of a given multimedia summary. Such summaries, however, may have a substantial impact on a prospective user, including a user's decision on whether or not to consume a full version of the digital content item that is summarized. Thus, from marketing perspective, techniques for evaluating the quality of summary of a multimedia content item are desirable. For instance, consider a digital article having both image and text portions. As will be appreciated in light of this disclosure, a summary of that article having a high degree of coherence between the image portions and the text portion might help one to have a better understanding of the article more quickly than say a summary lacking coherence between the image portions and text portions. In a more general sense, the degree to which a summary is representative of a corresponding multimedia content item can be quantified as a quality metric. A quality metric of a summary can then be used, for example, to gauge the likelihood that the summary will be effective in causing consumption of the content item itself. While some available algorithms might be usable to evaluate the text portions of a given multimedia summary (or simply "summary" herein, for brevity) of a multimedia content item, such algorithms would fail to consider the non-text portions (e.g., images) of that summary. Specifically, algorithms for evaluating content would likely operate by comparing a frequency of words in a text portion of the multimedia content to the frequency of words in the corresponding summary. The more similar the word frequencies of the summary are to word frequencies in the multimedia content item, the higher the quality score. Examples of this type of algorithm include retention rate (which could operate, for instance, by dividing the number of unique words in the summary by the number of unique words in the multimedia content item), KL-divergence (which could operate, for instance, by measuring the distribution of word frequencies in the content and corresponding summary), Bilingual Evaluation Understudy ("BLEU") (which determines the quality of machine-translated text from one language into another), and Recall-Oriented Understudy for Gisting Evaluation ("ROUGE") (which determines the quality of a summary using human-generated summaries as a reference).

As will be appreciated in light of this disclosure, however, the above algorithms, and similar algorithms, are inadequate if used to determine quality of a summary of a multimedia content item. One reason is that, because these algorithms rely primarily on word frequency, the semantic meaning of the summary is not compared to the semantic meaning of the multimedia (non-text) content item. This word frequency approach can therefore problematically generate a high value of a quality metric even for a summary that has a very different semantic meaning from a corresponding multimedia content item. For example, consider a simplistic example of a text portion of a multimedia content item that states "this girl does not like cheese." A corresponding summary that has a text portion stating "this girl does like cheese" would score well using a word frequency algorithm, but would not be accurate given the absence of "not" in the summary. In another example scenario, a multimedia content item that includes a text portion that refers to an accompanying image portion using a pronoun could have a high scoring summary that is not informative. For example, consider a multimedia content item that includes a picture of a shirt accompanied by a text caption "this is nice." Absent an analysis of the image portion of the shirt, a summary stating "this is nice" may be given a high value of a quality metric because it conforms exactly to the text portion of the multimedia content item (i.e., there is a high degree of correlation between the text of the summary and the text of the full article). However, if the image was actually considered, the summary might have been "this shirt is nice" which is a relatively much more accurate summary, and therefore should score higher than a mere text-based score. Thus, using currently available algorithms, a summary can be determined to misleadingly have a high quality score, but not accurately reflect the semantic meaning of the multimedia content item.

To this end, techniques are provided herein for determining a quality metric of a multimedia summary of a multimedia content item, by considering both textual and non-textual components of that summary. In some embodiments, the quality metric is based, in part, on semantic similarities of the summary and content item, rather than just on word frequencies. This is accomplished in some embodiments by identifying a semantic meaning of the summary and multimedia content item using vector analysis. The vectors of the summary and the vectors of the multimedia content item are compared to determine semantic similarity. Note that both text and non-text items can readily be represented by vectors, thereby facilitating the vector-based comparison.

In addition to assessing similarity of semantic meaning between the given multimedia content item and its multimedia summary, the techniques may further include determining a degree of correlation between the text and non-text portions of the summary itself. As will be appreciated in light of this disclosure, high degree of correlation or "coherence" between the text and non-text portions of the summary tends to indicate a higher quality summary. So, some embodiments of the present disclosure provide methods for determining a quality metric of a multimedia summary of a multimedia content item based, in part, on determining coherence between an image portion of a summary and a text portion of the summary for determining a quality metric of a multimedia summary. "Coherence" refers to a similarity in semantic meaning between a text portion of a multimedia summary and an image portion of the multimedia summary and is determined according to methods described below. At a high level, determining coherence is accomplished by generating vectors from both segments of a text portion and from segments of an image portion and projecting the vectors onto a common unit space. The projected vectors are then compared. Vectors that are proximate to one another in the common unit space correspond to semantically similar information across both text portions and image portions of the summary, and thus a high degree of coherence between those portions. Note that if the given multimedia summary includes a video rather than (or in addition to) static images, the video can be treated as a collection of static images (or frames), where each image is evaluated separately against the text portion of the summary in the same way as a static image. Then, an average or other suitable statistical representation of the individual comparisons can be computed, so as to provide an overall degree of coherence between the text portion and the video. To this end, reference to "image" herein is intended to include frames of video content.

One benefit of some embodiments of the present disclosure is the improved accuracy of the quality metric. There are several reasons for the improved accuracy. One reason is that some embodiments of the present disclosure analyze both a text portion and an image portion of a multimedia content item and a corresponding summary. This improves the accuracy of the quality metric because the quality metric thus reflects the semantic meaning communicated in both the text portions and image portions of the multimedia content item and the corresponding summary. Another reason for the improved accuracy is that some embodiments analyze and incorporate the coherence between the text portion of the summary and the image portion of the summary. This improves the accuracy because summaries having a text portion and an image portion that are semantically similar will produce a high quality metric when using embodiments of the present disclosure.

Another benefit of some embodiments of the present disclosure is the ability to tailor the weights of three different contributions to the multimedia quality metric. In particular, through user-selectable coefficients, the individual contributions of: (1) information content of the text portion of the summary relative to the text portion of the multimedia content ("text coverage"); (2) information content of the image portion of the summary relative to the image portion of the multimedia content item ("image coverage"); and (3) coherence between text and image of the summary can be weighted according to user preference, according to some embodiments. Some embodiments are tailored to make an evaluation of a summary consistent with a set of topics, or consistent with user selected topics and interests. Some embodiments can be tailored to improve the accuracy of comparison between semantic meanings of image portions, text portions, or both.

As used herein, the term multimedia content item refers to a content item that includes a text portion and an image portion. The image portion can be a still image of any format in any type of digital resource (e.g., an electronic book, a web page, a mobile application, a digital photograph), or a frame of a video as previously explained. Each of the text portion and the image portion comprise text segments and image segments, respectively. A text segment is a sentence, clause of a sentence, a word in a sentence, or a character (i.e., a number, a symbol, a letter). An image segment is a frame or portion of a frame of an image, or an object within a frame of an image. Information content of a text portion or of a text segment refers to the number of words in a text portion or text segment that can convey meaning (e.g., nouns, verbs, and adjectives) in contrast to words that generally do not convey meaning by themselves (e.g., conjunctions and articles). Information content of an image portion or an image segment refers to frames, portions of a frame, or objects within a frame that can convey a meaning (e.g., an image of a face compared to unfocused background). As indicated above, "coherence" refers to a similarity in semantic meaning between a text portion of a summary and an image portion of summary. The term "quality," as used herein, refers to the degree of similarity between a semantic meaning of a summary compared to the semantic meaning of a corresponding multimedia content item. The higher the value of a quality metric, the closer the summary and the corresponding multimedia content item are in semantic meaning.

Methods of Determining a Quality Metric

Figure 1:
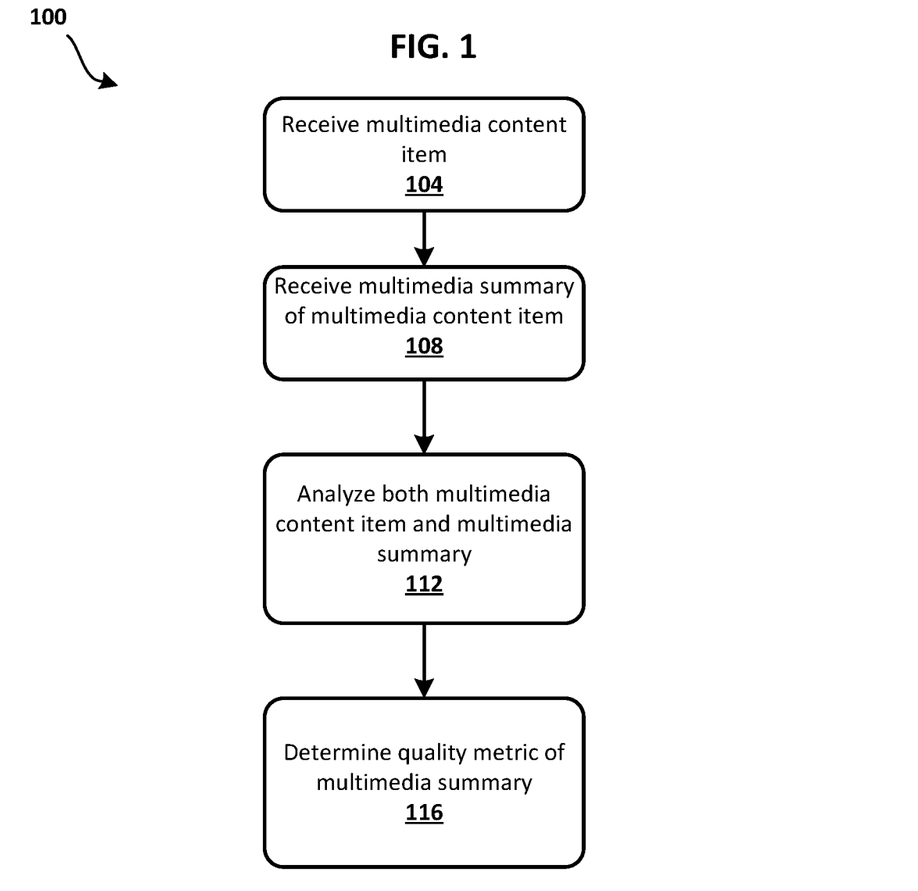
FIG. 1 is a high level flow diagram illustrating a method for determining a quality metric of a summary corresponding to a multimedia content item, in accordance with an embodiment of the present disclosure.

FIG. 1 is a high level flow diagram illustrating a method 100 for determining a quality metric of a multimedia summary corresponding to a multimedia content item, in accordance with an embodiment of the present disclosure. The method 100 begins by receiving 104 a multimedia content item and also receiving 108 a multimedia summary corresponding to the multimedia content item. As presented above, the application of the method 100 to a multimedia content item and a multimedia summary is merely one embodiment. Other embodiments of the present disclosure are applicable to content items and summaries containing only one or the other of a text portion and an image portion.

Some embodiments of the present disclosure then analyze 112 both of the multimedia content item and the multimedia summary. The analysis 112 is described below in more detail in the context of FIG. 2. Based on the analysis 112, a quality metric of the multimedia summary is determined 116. The quality metric and its determination 116 are described below in more detail, also in the context of FIG. 2.

Figure 2:
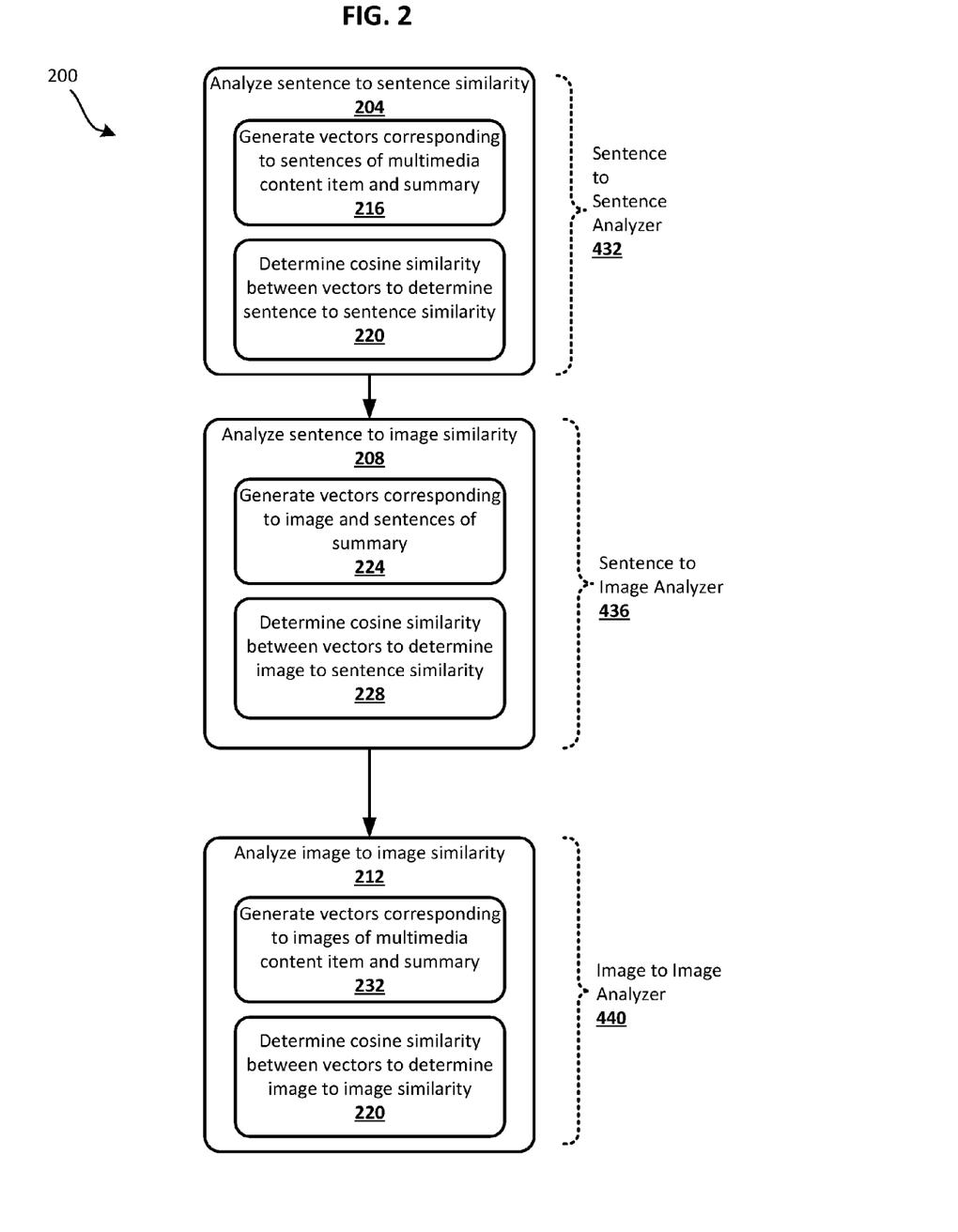
FIG. 2 is a detailed flow diagram illustrating a method for determining a quality metric of a summary corresponding to a multimedia content item, in accordance with an embodiment of the present disclosure.

FIG. 2 is a detailed flow diagram illustrating a method 200 for determining a quality metric of a multimedia summary corresponding to a multimedia content item, in accordance with an embodiment of the present disclosure. The method is illustrated, for convenience of illustration, as including three metasteps (presented in no particular order): (1) analyzing 204 semantic similarity between sentences of a text portion of a multimedia content item and sentences of a text portion of a summary; (2) analyzing 208 semantic similarity between sentences of a text portion of a summary and images of an image portion of the summary; and (3) analyzing 212 a semantic similarity between images of an image portion of a multimedia content item and images of an image portion of a summary. The elements of the method 100 regarding receiving the multimedia content item and multimedia summary are omitted from FIG. 2 for convenience of explanation.

Metastep 204 of method 200 illustrates operations for analyzing similarity between sentences (or sentence segments) of a text portion of a multimedia content item and sentences (or sentence segments) of a text portion of a summary. The function and benefit of this analyzing 204 operation is determining a degree to which the semantic meanings between text portions of a multimedia content item and a text portion of a corresponding summary are comparable. This analyzing 204 is accomplished by first generating 216 vectors for sentences in the text portions each of the multimedia content item and the summary to determine whether the text portion of the summary conveys a same (or similar) semantic meaning as that conveyed by the text portion of the multimedia content item. The more similar the semantic meanings conveyed, the higher the contribution to the quality metric of the text portion of the summary.

The vectors are generated 216 by first processing the text portions of both the multimedia content item and the summary using a recursive auto encoder. First, an encoding matrix $W_e$ is trained. $W_e$, once trained, is used to analyze sentences of the multimedia content item and the corresponding summary to extract the respective semantic meanings and compare them in a common unit space (described below in more detail).

To train the encoding matrix $W_e$, the recursive auto encoder first generates a syntactic parse tree for at least one training sentence. A semantic vector for each word and clause within each training sentence is generated. Each non-terminal (i.e., non-leaf) node of the parse tree is generated according to equation 1, which follows.

$$s = f(W_e[c_1, c_2] + b) \quad \text{Equation 1}$$

In equation 1, s represents the non-leaf node, $W_e$ is the trained encoding matrix, and $c_1$ and $c_2$ (more generally, $c_i$) are word to vector representations. Specifically, $c_i$ includes sentence segments that are elements of the parse tree. These sentence segments are subsets of one or more of the training sentences. The term b in equation 1 is a constant. The function $f$ is, in one example, a sigmoid function that produces a result between 0 and 1 when it operates on the arguments of the function.

The training of matrix $W_e$ continues with the recursive auto encoder reconstructing elements under each node in the parse tree for each sentence of the multimedia content item and the corresponding summary according to equation 2, which follows.

$$[x_1'; y_1'] = f(W_d y_2 + b) \quad \text{Equation 2}$$

Equation 2 describes an output of a plurality of vectors (from vector $x_1'$ to vector $y_1'$) based on the operation of matrix $W_d$ on sentence $y_2$, which is subsequently processed with the sigmoid function $f$.

When training of the matrix $W_e$ is completed, a vector representation of the root of the parse tree is then generated and used as a representative vector of a sentence using trained matrix $W_e$. The vectors generated for each sentence are then used for computing a cosine similarity between a sentence of the multimedia content item and corresponding sentences of a summary. The similarity $S_T(u,v)$ between the sentences of the text portions of the multimedia content item and the text portions of the summary is determined based on cosine similarity (indicated by the "Sim" function) according to equation 3, which follows.

$$S_T(u,v) = \text{Sim}(\bar{u}, \bar{v}) \quad \text{Equation 3}$$

In equation 3, $\bar{u}$ and $\bar{v}$ are vector representations of the text segments of the text portion of a summary (u) and the text portion of the multimedia content item (v), respectively. The cosine similarity quantifies the similarity in semantic meaning between text portions of sentences of the multimedia content item and the summary, which is then later used as a contribution to the multimedia summary quality metric, as described in more detail below.

Metastep 208 of method 200 illustrates operations for analyzing similarity between sentences of a text portion of a summary and an accompanying image portion of the summary. The function and benefit of this analyzing 204 operation is determining a degree to which the semantic meanings between a text portion of a summary and an accompanying image portion of a summary correspond to one another. The more semantic similarity there is between the text and an accompanying image, the higher the quality of the multimedia summary.

In an analogous process to the one described above, vectors are generated 224 corresponding to image content and text content of the summary in a method similar to the one described by Karpathy et al. (Deep Fragment Embeddings for Bidirectional Image Sentence Mapping, *Neural Information Processing Systems*, 2014, pp. 1889-1897.), which is incorporated by reference herein in its entirety. The process for generating vectors of an image portion of a summary is described first.

The process for generating 224 vectors corresponding to an image portion of a summary includes first identifying segments of the image portion likely to be relevant to the summary. The segments are identified by training a deep neural network auto encoder, which is then applied to the image to extract relevant image portions. At a high level, this process is accomplished by extracting pixel values from an image and using the pixel values, either individually or in associated groups, to identify higher levels of organization within the image that correspond to objects in the image.

Once the image segments are identified, a regional convolutional neural network (RCNN) is used to generate vectors corresponding to each of the identified image segments. In one embodiment the RCNN generates 4096-dimensional vectors corresponding to each identified segments, as described by Girshick et al. (See Rich Feature Hierarchies for Accurate Object Detection and Semantic segmentation, *Computer Vision and Pattern Recognition*, 2014.), which is incorporated by reference herein in its entirety. The 4096-dimensional space represents a convenient compromise between consumption of computational resources and quality of output. Because 4096 is equal to $2^{12}$, it is therefore is conveniently applied to binary data bits. Lower dimensional spaces can be used, but with less discrimination between features. Higher dimensional spaces can also be used, but with increased consumption of computing resources.

Intersections between any two vectors are identified. A subset of the segments for which vectors are generated are selected based on a likelihood of one of the image segments corresponding to a portion of an image semantically relevant to the summary. In some embodiments, the segments identified are further restricted based on a classification determined using the vectors to reduce the risk of overrepresentation of any image segments in subsequent steps of the analysis.

Vectors corresponding to text portions of a summary are generated 224 using the processes described above in the content of element 216 of metastep 204.

The image vectors and the sentence vectors are then projected onto a common unit space by a matrix transformation. The matrices used to transform the vectors onto a common unit space have been trained so that semantically similar elements, whether in the image portion or the text portion, are correspondingly projected on areas of the common unit space reflecting the semantic similarity.

One benefit of projecting vectors onto a common unit space is reducing the influence of irrelevant information for the determination of semantic similarity. For example, vectors as generated may include extraneous information (e.g., color, texture, shape) that is not relevant to the semantic meaning of either the image or the text portions. By mapping the vectors to a common unit space, the effect of this extraneous information is reduced.

The cosine similarity of the vectors corresponding to image and text portions of a summary are then determined according to equation 4, which follows.

$$C_{T,I}(u,p)=\text{Sim}(\tilde{u},\tilde{p}) \qquad \text{Equation 4}$$

In this equation, $\tilde{u}$ and $\tilde{p}$ are the vector-representations of the text segments of a text portion u of a summary and image segments of an image portion p of a summary, obtained using the methods described above.

Metastep 212 of method 200 illustrates operations for analyzing similarity between an image portion of a summary and an image portion of a multimedia content item, in an embodiment. As explained above in the context of metastep 208, vectors are determined for the images and are projected onto a common unit space. A cosine similarity between the images based on the generated vectors is determined according equation 5, which follows.

$$S_I(p,q)=\text{Sim}(\tilde{p},\tilde{q}) \qquad \text{Equation 5}$$

In equation 5, $\tilde{p}$ and $\tilde{q}$ are the vector-representations of the image segments p and q of image portions of a summary and multimedia content item, respectively.

Having generated similarity scores for the various elements of a multimedia content item and a corresponding summary as described above in the method 200, a multimedia quality metric is determined 116, as shown in FIG. 1 and as described below in more detail.

Determining a Multimedia Summary Metric

Referring once again to FIG. 1, the process for determining 116 a quality metric quantifying a degree of similarity between a semantic meaning of a summary to a multimedia content item using the information determined in the analysis 112 (and corresponding method 200) is described below.

The multimedia summary quality metric is determined according to equation 6, which follows.

$$MuSQ=f(IC_{text}, IC_{image}, Coh_{total}) \qquad \text{Equation 6}$$

Where MuSQ is the multimedia quality summary metric, $IC_{text}$ is a metric describing a proportional amount of information in a text portion of a summary relative to a text portion of a multimedia content item, $IC_{image}$ is a proportional amount of information in an image portion of a summary relative to an image portion of a multimedia content item. The term "f" in equation 6, and as used elsewhere in the present disclosure, represents a generic function and not a specific function. $Coh_{total}$ is the "coherence" between a text portion of a summary and an image portion of the summary. Coherence reflects the degree of semantic similarity between a text portion of a summary and an image portion of the summary, with a higher number reflecting more semantic similarity between the text and image of the summary. In one embodiment, equation 6 is a non-decreasing sum of its arguments, as shown below in equation 7.

$$MuSQ=A \cdot IC_{text}+B \cdot IC_{image}+C \cdot Coh_{total} \qquad \text{Equation 7}$$

In equation 7, A, B, and C are positive constants used to change the relative contribution of each argument to MuSQ. $IC_{text}$ is defined below in equation 8.

$$IC_{text} = \sum_{v \in doc-text} R_v^* \max_{u \in S}\{S_T(u, v)\} \qquad \text{Equation 8}$$

In equation 8, $S_T$ is defined above in equation 3 and $R_v$ is a number of terms or words possibly contributing to the semantic meaning of a text portion of the multimedia content item (referred to above as "information content"). That is, $R_v$ is the word count of nouns, verbs, adjective, adverbs, and pronouns in the text segments of text portion. Articles, conjunctions, and the like are omitted from the determination of $R_v$.

The "max" function is taken over the text segments u present in a text portion of the summary for a given text segment v of the multimedia content item. The result of the "max" function is maximal representation of a text segment v present in the summary S. The "max" function also prevents redundant sentences in a summary increasing a quality metric score because only a summary sentence or segment that is most relevant to the multimedia content item contributes to the metric. In other words, using this function facilitates selection of a sentence with the most information content from among multiple sentences in the multimedia content item regarding a particular semantic. This improves the score of a summary that includes a more diverse coverage of multimedia content because duplicative sentences do not contribute (or contribute less) to a score where sentences and images representing diverse topics are scored as contributing more information content.

The result of the "max" function is multiplied by the information content of the sentence $R_v$. Including the information content $R_v$ in equation 8 aids selection of segments conveying more information (in terms of the number of nouns, adjectives, etc.) compared to less informative sentences having a lower count of the identified types of "informative" words. A summation of this quantity over all the text segments v present in a multimedia content item is an indicator of quality of a text portion of the summary relative to the multimedia content item as a whole.

$IC_{image}$ is defined below in equation 9.

$$IC_{image} = \sum_{q \in doc-image} \hat{R}_q^* \max_{p \in I}\{S_I(p, q)\} \qquad \text{Equation 9}$$

$S_I(p, q)$, as defined above in equation 5, denotes the information content of an image segment p (in the summary) about the image q (in the multimedia content item). In one embodiment, $S_I$ quantifies a similarity between an image segment in a summary p compared to a corresponding image segment in a multimedia content item q. The quantification of $S_I$ is determined based on representations of the image segments as analyzed by a Recurrent Convolutional Neural Network (RCNN) optionally projected onto a common unit space, as described above. The term $\hat{R}_q$ is the information content of the image q of the multimedia content item. In one embodiment, $\hat{R}_q$ is determined by converting the image segment q into text as described above in the context of metastep 208 (and specifically vector generated 224), and then measuring the information content of that text using the methods described above. The function of $\hat{R}_q$ is similar to that of the $R_u$ term described above.

In equation 9, the max function is taken over image segments p present in the image part of the summary for a given image segment q of the multimedia content item. The result is a maximum representation of the image segment q present in the image part of the summary S. Summing this quantity over all the image segments q present in the multimedia content item provides an indication of how representative the image portion of the summary is of the multimedia content item.

$Coh_{total}$ is defined below in equation 10.

$$Coh_{total} = \sum_{u \in S} \sum_{p \in I} C_{T,I}(u, p)^* R_u^* \hat{R}_p \quad \text{Equation 10}$$

In equation 10, $C_{T,I}(u, p)$ denotes the coherence between a sentence (or text segment) u from a text portion of a summary S and an image segment p of an image portion I a summary. As described above in the context of equation 4, $C_{T,I}$ may be projected onto common unit space to compare the vectors of the extracted text portion and image portions of the summary. $R_u$ and $\hat{R}_p$ are the information contents of the text portions and image portions, as defined above.

Example Systems

Figure 3:
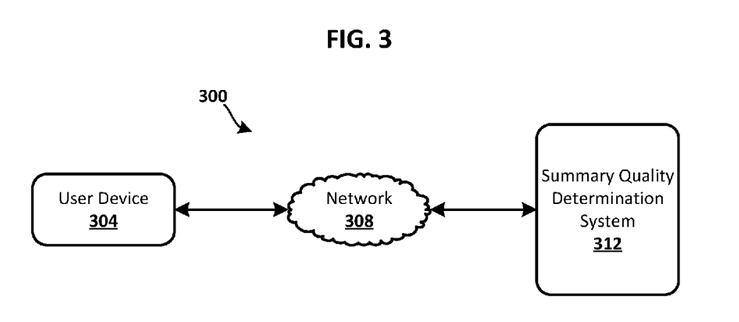
FIG. 3 is a block diagram of a distributed processing environment that includes a quality metric determination system remotely coupled to a computing device of a given user by a communication network, in accordance with an embodiment of the present disclosure.

FIG. 3 is a block diagram of a distributed processing environment that includes a quality metric determination system remotely coupled to a computing device of a given user by a communication network, in accordance with an embodiment of the present disclosure. The distributed processing environment 300 shown in FIG. 3 includes a user device 304, a network 308, and a summary quality determination system 312. In other embodiments, the system environment 300 includes different and/or additional components than those shown in FIG. 3.

The user device 304 is a computing device capable of receiving user input as well as transmitting and/or receiving data via the network 308. In one embodiment, the user device 304 is a computer system, such as a desktop or laptop computer. In another embodiment, the user device 304 may be a device having computer functionality, such as a personal digital assistant (PDA), mobile telephone, tablet computer, smartphone or similar device. In some embodiments, the user device 304 is a mobile computing device used for consuming multimedia content items, summaries corresponding to multimedia content items, and the methods described herein for determining a summary quality metric of a summary corresponding to a multimedia content item. The user device 304 is configured to communicate with the summary quality determination system 312 via the network 308. In one embodiment, the user device 304 executes an application allowing a user of the user device 304 to interact with the summary quality determination system 312, thus becoming a specialized computing machine. For example, the user device 304 executes a browser application to enable interaction between the user device 304 and the summary quality determination system 312 via the network 308. In another embodiment, a user device 304 interacts with the summary quality determination system 312 through an application programming interface (API) that runs on the native operating system of the user device 304, such as IOS® or ANDROID™.

The user device 304 is configured to communicate via the network 308, which may comprise any combination of local area and/or wide area networks, using both wired and wireless communication systems. In one embodiment, the network 308 uses standard communications technologies and/or protocols. Thus, the network 308 may include links using technologies such as Ethernet, 802.11, worldwide interoperability for microwave access (WiMAX), 3G, 4G, CDMA, digital subscriber line (DSL), etc. Similarly, the networking protocols used on the network 308 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 308 may be represented using technologies and/or formats including hypertext markup language (HTML) or extensible markup language (XML). In addition, all or some of links can be encrypted using encryption technologies such as secure sockets layer (SSL), transport layer security (TLS), and Internet Protocol security (IPsec).

Figure 4:
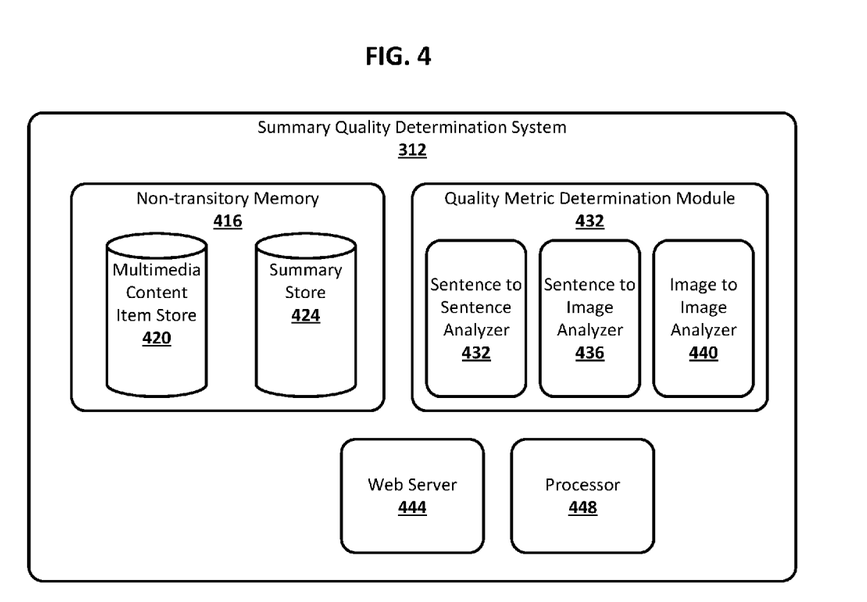
FIG. 4 is a block diagram of a quality metric determination system for determining a quality of a multimedia summary of a multimedia content item, in accordance with an embodiment of the present disclosure The figures depict various embodiments of the present disclosure for purposes of illustration only. Numerous variations, configurations, and other embodiments will be apparent from the following detailed discussion.

FIG. 4 is a block diagram of a system architecture of the summary quality determination system 312 as shown in FIG. 3. The summary quality system 312 is configured, upon receipt of multimedia content and a corresponding summary, to perform the some or all of the embodiments described above to determine a quality metric that is indicative of a degree of similarity between an overall semantic meaning of a summary compared to the semantic meaning of a corresponding multimedia content item. The summary quality determination system 312 includes non-transitory memory 416, and a quality metric determination module 432, sub-components of which are described below.

The non-transitory memory 416 is depicted as including two distinct memory elements: a multimedia content item store 420, and a summary store 524. The multimedia content item store 420 stores multimedia content items (and optionally content items that include only one of a text portion or an image portion) for analysis and optionally for display or transmission. The summary store 424 stores summaries that correspond to a multimedia content item. As with the multimedia content item store 420, the summary store 424 can store any one or more of text summaries, image summaries, and multimedia summaries that include both text portions and image portions. Regardless of the nature of the content and summary stored, the multimedia content item store 420 and the summary store 424 are in communication with the quality metric determination module 432.

The non-transitory memory 416 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The non-transitory memory 416 may include other types of memory as well, or combinations thereof. The non-transitory memory 416 may be provided as a physical element of the system 312 or provided separately or remotely from the system 312. The non-transitory memory 416 of the system 312 may store computer-readable and computer-executable instructions or software for implementing various embodiments, including the multimedia content item store 420 and the summary store 424.

When engaged, the quality metric determination module 432 communicates with the non-transitory memory 416, including the multimedia content item store 420 and the summary store 424 in order to receive, and subsequently analyze, a multimedia content item and corresponding summary. The quality metric determination module 432 includes a sentence to sentence analyzer 432, a sentence to image analyzer 436, and an image to image analyzer 440. The sentence to sentence analyzer analyzes the quality of sentences (or sentence segments) in a text portion of a summary with respect to sentences in a text portion of a multimedia content item, as described above in the content of FIGS. 1 and 2. The sentence to image analyzer analyzes the quality of sentences in a text portion of a summary with respect to an accompanying image portion of the summary, as described above in the context of FIGS. 1 and 2. The image to image analyzer analyzes the quality of image portions of an image portion of a summary with respect to an image portion of a corresponding multimedia content item, as described above in the context of FIGS. 1 and 2. Once each of these analyzers 432, 436, and 440 complete analysis, the quality metric determination module receives the output of the respective analyses to determine a summary quality metric, as described above.

The web server 444 links the summary quality determination system 312 to the user device 304 via the network 308. The web server 344 serves web pages, as well as other web-related content, such as JAVA®, FLASH®, XML, and so forth. The web server 344 may provide the functionality of receiving or transmitting content items and summaries from and to a user device 304, receiving and transmitting summary quality metrics from and to a user device, and otherwise facilitating the consumption of content items. Additionally, the web server 344 may provide application programming interface (API) functionality to send data directly to native client device operating systems, such as IOS®, ANDROID™, WEBOS® or RIM. The web server 344 also provides API functionality for exchanging data with the user device 304.

The summary quality determination system 312 also includes at least one processor 448 for executing computer-readable and computer-executable instructions or software stored in the non-transitory memory 416 and other programs for controlling system hardware. Virtualization may be employed so that infrastructure and resources in summary quality determination system 312 may be shared dynamically. For example, a virtual machine may be provided to handle a process running on multiple processors so that the process appears to be using only one computing resource rather than multiple computing resources. Multiple virtual machines may also be used with one processor.

Example Applications

The following two examples qualitatively describe applications of embodiments described herein. In the first example, a multimedia content item contains two unique sentences. A first sentence $Str_1$ includes a set of unique words $w_1$. $Str_1$ is repeated in the multimedia content item $n_1$ times. A second sentence $Str_2$ contains a set of unique words $w_2$. $Str_2$ is repeated in the multimedia content item $n_2$ times. For convenience of explanation, it is assumed that $w_1$ and $w_2$ do not have any words in common. This last assumption is expressed mathematically as $w_1 \cap w_2 = \phi$. Also, for this example it is assumed that the word counts $|w_1|=5$, $|w_2|=6$. The number of times $Str_1$ is repeated in the multimedia content item is $n_1=10$ and the number of times $Str_2$ is repeated in the multimedia content item is $n_2=2$.

If summary of only a single sentence is requested, two options are possible: either a summary $S_1$ that contains only $Str_1$ or a summary $S_2$ that contains only $Str_2$. Because $Str_1$ is repeated 10 times, five times more frequently than $Str_2$, the summary $S_1$ is preferable because it captures the information which is dominant in the original multimedia content item. Because $w_1$ and $w_2$ do not have any words in common, the total number of unique words is the multimedia content item is $w_1+w_2$. The retention rate of words in each of the summaries $S_1$ and $S_2$ compared to the multimedia content item follows in equations 11 and 12.

$$\text{Retention Rate}(S_1) = \frac{|w_1|}{|w_1|+|w_2|} = 5/(5+6) = 5/11 \quad \text{Equation 11}$$

$$\text{Retention Rate}(S_2) = \frac{|w_2|}{|w_1|+|w_2|} = 6/(5+6) = 6/11 \quad \text{Equation 12}$$

A retention rate algorithm such as the one presented above would preferentially select $S_2$ because it has a highest number of unique words of the summaries analyzed. The retention rate algorithm bases this selection criterion on the assumption that a summary that includes more unique words describes more of the content in the multimedia content item. However, because these methods look at only word counts, significant semantic differences are overlooked. In this example, retention rate would select the summary $S_2$ which has more unique words even though it is less representative of the overall content of the multimedia content item.

According to the embodiments of the present disclosure, a summary having a higher information content and broader coverage of the multimedia content item as a whole (i.e., reflecting different topics throughout the multimedia content item) is preferred. In contrast to the above retention rate examples, consider embodiments of the present disclosure applied to select between summary 1 ($S_1$) and summary 2 ($S_2$). Equations 13 and 14 apply embodiments of the present disclosure to the above scenario.

$$MuSQ(S_1)=n1*w1=10*5=50 \quad \text{Equation 13}$$

$$MuSQ(S_2)=n2*w2=2*6=12 \quad \text{Equation 14}$$

In the above examples, equation 7 is reduced to the form of equations 13 and 14 because the example includes only text portions, therefore reducing the arguments of equation 7 that analyze image portions (i.e., $IC_{image}$ and $Coh_{total}$) to zero. Therefore the only term remaining from equation 7 is that of $IC_{text}$. In this case, $IC_{text}$ reduces to the number of words in the sentence contributing to semantic meaning ($R_v$) because the "max" term is 1. Based on the above, embodiments of the present disclosure would select $S_1$ because it is more representative of the multimedia content item (i.e., selecting $S_1$ that includes sentence $Str_1$, which is repeated five times more frequently than $Str_2$).

In another example, consider the advantages of embodiments of the present disclosure over KL Divergence. Adapting the preceding example, summaries $S_1$ and $S_2$ are defined as $S_1=\{Str_1, Str_2\}$ and $S_2=\{Str_1, Str_1\}$ and $|w_1|=5$, $w_2|=6$ and $w_1 \cap w_2 = \phi$. Because $S_1$ includes more information (i.e., both of $Str_1$ and $Str_2$) in contrast to $S_2$ which includes only $Str_1$ repeated twice), $S_1$ is the preferred summary.

Recall that KL Divergence is defined in equation 15 which follows.

$$KL = \sum_i q_i \log\left(\frac{q_i}{p_i}\right) \quad \text{Equation 15}$$

In equation 13, $q_i$ is the probability of occurrence of $i^{th}$ word in the summary, and p is the probability of occurrence of $i^{th}$ word in the original document. Summary $S_2$ will be selected by KL Divergence if $KL(S_2)<KL(S_1)$. Based on known applications of mathematics, the ratio of equation 16 determines the selection criteria.

$$n_1 > 4.3 * n_2 \Rightarrow KL(S_2) < KL(S_1) \quad \text{Equation 16}$$

In this example, $n_1=10$ and $n_z=2$, so $n_1>4.3*n_2$. For this reason, $S_2$ will be selected as the preferred summary by KL Divergence in this case even though S2 has less information than S1.

In contrast, applying embodiments of the present disclosure $MuSQ(S_1)=n_1*w_1+n_2*w_2=10*5+2*6=62$ and $MuSQ(S_2)=n_1*w_1=10*5=50$. Applying this model, $S_1$ is properly selected as the preferred summary because of the diversity of information.

Further Considerations

As will be appreciated in light of this disclosure, the various modules and components of the system shown in FIGS. 3 and 4, such as the sentence to sentence analyzer 432, sentence to image analyzer 436, and image to image analyzer 440, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment, including the computing device 1000, can be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Example Embodiments

In one example, a computer-implemented method for evaluating a summary of a digital multimedia content item includes receiving the multimedia content item comprising a text portion and an image portion, receiving the summary of the multimedia content, the summary including a text portion and an image portion, and determining a quality metric of the summary relative to the multimedia content item. The determining includes determining at least two of a first content metric quantifying an amount of information content in the text portion of the summary that is common to the text portion of the multimedia content item, determining a second content metric quantifying an amount of information content in the image portion of the summary common to the image portion of the multimedia content item, and determining a third content metric quantifying an information coherence between the text portion of the summary and the image portion of the summary. The quality metric is based at least in part on the at least two determined content metrics. In one embodiment of this example, determining the quality metric further includes determining a product of the first content metric, the second content metric, and the third content metric. In one embodiment of this example, determining the first content metric includes determining a cosine similarity between vector representations of at least one text segment of the text portion of the multimedia summary and at least one text segment of the multimedia content item. A max function can be applied to the cosine similarity determination. In one embodiment of this example, determining the second content metric includes generating a first image vector from the image portion of the summary and a second image vector from the image portion of the multimedia content item. In one embodiment of this example, determining the third content metric includes projecting a first text content vector from the text portion of the summary and a second text content vector from the image portion of the summary onto a common unit space. In one embodiment of this example, determining the third content metric includes determining a product of a first content of the text portion of the summary and a second content of the image portion of the summary.

In another example, a computer program product is stored on at least one non-transitory computer-readable medium that includes instructions that when executed by one or more processors cause the above computer-implemented method to be carried out.

In another example, a system for evaluating a summary of a digital multimedia content item includes various modules, at least one processor, and at least one non-transitory storage media for determining a quality metric according to the example method described above.

What is claimed is:

1. A computer-implemented method for evaluating a summary of a digital multimedia content item, the method comprising:
receiving the multimedia content item comprising a text portion and an image portion;
receiving the summary of the multimedia content item, the summary including a text portion and an image portion;
determining a quality metric of the summary relative to the multimedia content item, the determining comprising at least two of:
determining a first content metric quantifying an amount of information content in the text portion of the summary that is common to the text portion of the multimedia content item;
determining a second content metric quantifying an amount of information content in the image portion of the summary common to the image portion of the multimedia content item; and
determining a third content metric quantifying an information coherence between the text portion of the summary and the image portion of the summary;
wherein the quality metric is based at least in part on the at least two of the determined content metrics.

2. The method of claim 1, wherein determining the quality metric further comprises determining a product of the first content metric, the second content metric, and the third content metric.

3. The method of claim 1, wherein determining the first content metric comprises determining a cosine similarity between vector representations of at least one text segment of the text portion of the multimedia summary and at least one text segment of the multimedia content item.

4. The method of claim 3, further comprising applying a max function to the cosine similarity.

5. The method of claim 1, wherein determining the second content metric comprises generating a first image vector from the image portion of the summary and a second image vector from the image portion of the multimedia content item.

6. The method of claim 1, wherein determining the third content metric comprises projecting a first text content vector from the text portion of the summary and a second content vector from the image portion of the summary onto a common unit space.

7. The method of claim 1, wherein determining the third content metric comprises determining a product of a first content of the text portion of the summary and a second content of the image portion of the summary.

8. A computer program product wherein the computer program product is stored on at least one non-transitory computer-readable medium that includes instructions that when executed by one or more processors cause a process to be carried out, the process comprising:
receiving a multimedia content item comprising a text portion and an image portion;
receiving a summary of the multimedia content item, the summary including a text portion and an image portion;
determining a quality metric of the summary relative to the multimedia content item, the determining comprising at least two of:
determining a first content metric quantifying an amount of information content in the text portion of the summary that is common to the text portion of the multimedia content item;
determining a second content metric quantifying an amount of information content in the image portion of the summary common to the image portion of the multimedia content item; and
determining a third content metric quantifying an information coherence between the text portion of the summary and the image portion of the summary;
wherein the quality metric is based at least in part on the at least two determined content metrics.

9. The computer program product of claim 8, wherein determining the quality metric further comprises determining a product of the first content metric, the second content metric, and the third content metric.

10. The computer program product of claim 8, wherein determining the first content metric comprises determining a cosine similarity between vector representations of at least one text segment of the text portion of the multimedia summary and at least one text segment of the multimedia content item.

11. The computer program product of claim 10, further comprising applying a max function to the cosine similarity.

12. The computer program product of claim 8, wherein determining the second content metric comprises generating a first image vector from the image portion of the summary and a second image vector from the image portion of the multimedia content item.

13. The computer program product of claim 8, wherein determining the third content metric comprises projecting a first text content vector from the text portion of the summary and a second content vector from the image portion of the summary onto a common unit space.

14. The computer program product of claim 8, wherein determining the third content metric comprises determining a product of a first content of the text portion of the summary and a second content of the image portion of the summary.

15. A system for evaluating a summary of a digital multimedia content item, the system comprising:
a multimedia content item store configured to receive a multimedia content item comprising a text portion and an image portion;
a summary store configured to receive a summary including a text portion and an image portion;
a quality metric determination module configured to determine a quality metric of the summary relative to the multimedia content item, the determining comprising at least two of:
determining a first content metric quantifying an amount of information content in the text portion of the summary that is common to the text portion of the multimedia content item;
determining a second content metric quantifying an amount of information content in the image portion of the summary common to the image portion of the multimedia content item; and
determining a third content metric quantifying an information coherence between the text portion of the summary and the image portion of the summary;
wherein the quality metric is based at least in part on the at least two determined content metrics.

16. The system of claim 15, wherein the quality metric determination module further configured to determine the quality metric by determining a product of the first content metric, the second content metric, and the third content metric.

17. The system of claim 15, wherein the quality metric determination module is further configured to determine the first content metric by determining a cosine similarity between vector representations of at least one text segment of the text portion of the multimedia summary and at least one text segment of the multimedia content item.

18. The system of claim 17, wherein the quality metric determination module is further configured to determine the first content metric by applying a max function to the cosine similarity.

19. The system of claim 15, wherein the quality metric determination module is further configured to determine the second content metric by generating a first image vector from the image portion of the summary and a second image vector from the image portion of the multimedia content item.

20. The system of claim 15, wherein the quality metric determination module is further configured to determine the third content metric by projecting a first text content vector from the text portion of the summary and a second content vector from the image portion of the summary onto a common unit space.

* * * * *